UNITED STATES PATENT OFFICE.

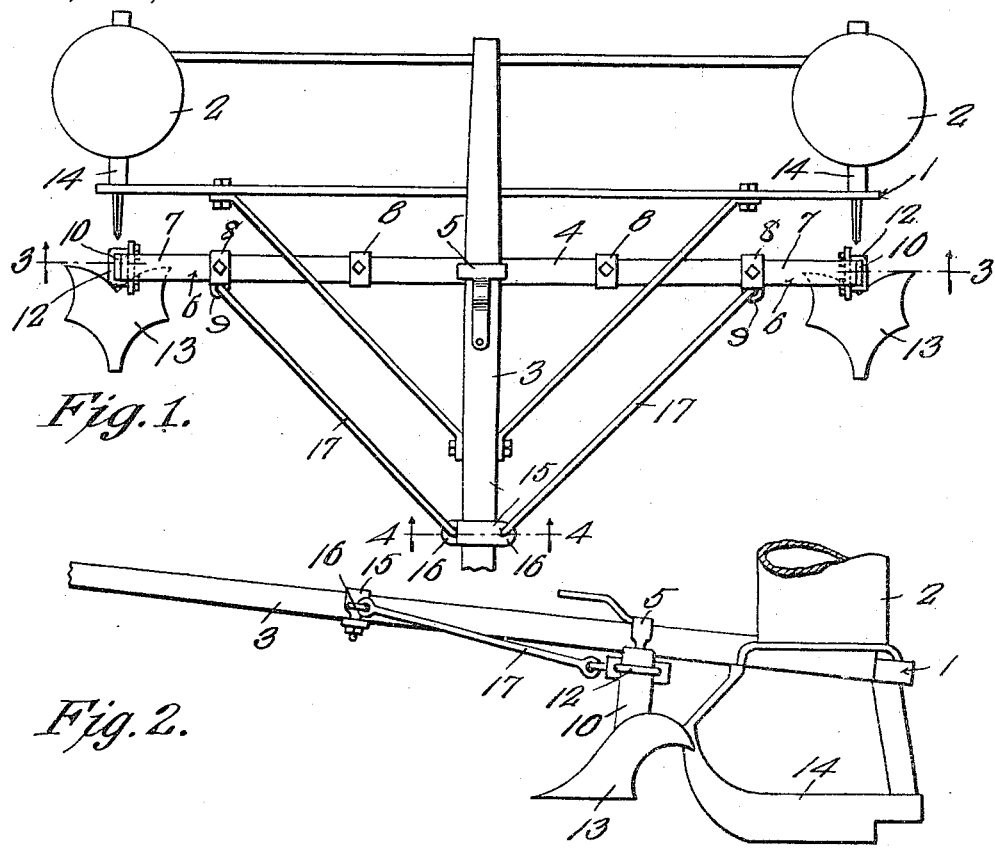

JOSEPH LETRICH, OF EL CENTRO, CALIFORNIA.

SEED-PLANTER.

1,211,603. Specification of Letters Patent. Patented Jan. 9, 1917.

Application filed June 28, 1916. Serial No. 106,453.

*To all whom it may concern:*

Be it known that I, JOSEPH LETRICH, a citizen of the United States, residing at El Centro, in the county of Imperial, State of California, have invented certain new and useful Improvements in Seed-Planters; and I do hereby declare the following to be a full, clear, and exact description of the invention, such as will enable others skilled in the art to which it appertains to make and use the same.

The present invention relates to seed planters, and more particularly to an attachment therefor.

The invention has for its object to provide an attachment which can be easily and quickly attached to or removed from a conventional form of planter frame, and when in place thereon serves to break hard soil in advance of the planter shoes.

A further object of the invention is to provide an attachment of this kind so constructed that the shovel standards can be adjusted to dig at different depths, and further to provide means whereby the shovel can be adjusted laterally so as to be alined with the shoes of the planter.

With these and other objects in view, this invention resides in the novel features of construction, formation, combination and arrangement of parts to be hereinafter more fully described, claimed and illustrated in the accompanying drawing, in which:—

Figure 1 is a top plan view of the device. Fig. 2 is a side elevation thereof. Fig. 3 is a sectional view on line 3—3 of Fig. 1. Fig. 4 is a similar view on line 4—4 of Fig. 1.

Referring to the drawing 1 indicates the frame of the planter, which is provided with the usual seed boxes 2 and draft tongue 3.

The attachment comprises a main bar 4, said bar being provided centrally with a U-bolt 5 which serves to clamp the bar 4 to the tongue 3. A pair of angle bars 6 are employed, the horizontal arms 7 thereof being adjustably secured to the main bar 4 by clamps 8, certain of said clamps being provided with loops 9, the purpose of which will appear later.

The shovel standards 10 are adjustably connected to the vertical arms 11 of the bars 6 by U-bolts 12. Thus it will be seen that the standards 10 can be adjusted vertically so as to regulate the digging action of the shovels 13 which are secured to the standards, and further that the angle bar 6 can be adjusted longitudinally of the main bar 4 so that the shovels 13 can be alined with the planter shoes 14.

A clamp 15 is secured on the tongue 3 in advance of the bar 4, and is provided with eyes 16, said eyes being connected with the forward ends of the brace rods 17, the rear ends of said rods being connected with the loops 9, thereby firmly bracing the main bar 4 as well as the angle bars 6.

What is claimed is:—

An attachment for planters comprising a main bar, means for attaching the bar to the tongue of a planter, angle bars, shovel supporting standards adjustably connected each to one arm of each angle bar, clamps adjustably connecting the remaining arms of the angle bars to the main bar, certain of said clamps having loops, a clamp adapted to be secured to the tongue of a planter, and brace bars connecting the last named clamp and said loops.

In testimony whereof, I affix my signature, in the presence of two witnesses.

JOSEPH LETRICH.

Witnesses:
M. MOORE,
M. K. SIMMONS.

Copies of this patent may be obtained for five cents each, by addressing the "Commissioner of Patents Washington, D. C."